(12) United States Patent
Bakalash

(10) Patent No.: US 12,220,643 B2
(45) Date of Patent: *Feb. 11, 2025

(54) BUILD AND DESIGN-AN INTEGRATED-REALITY EDUCATIONAL GAMING APPLICATION

(71) Applicant: Reuven Bakalash, Shdema (IL)

(72) Inventor: Reuven Bakalash, Shdema (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/420,062

(22) Filed: Jan. 23, 2024

(65) Prior Publication Data

US 2024/0165520 A1 May 23, 2024

Related U.S. Application Data

(63) Continuation-in-part of application No. 18/222,698, filed on Jul. 17, 2023.

(60) Provisional application No. 63/396,246, filed on Aug. 9, 2022.

(51) Int. Cl.
| | |
|---|---|
| *A63F 13/80* | (2014.01) |
| *A63F 13/213* | (2014.01) |
| *A63F 13/63* | (2014.01) |
| *A63F 13/65* | (2014.01) |
| *A63F 13/655* | (2014.01) |

(52) U.S. Cl.
CPC .............. *A63F 13/80* (2014.09); *A63F 13/63* (2014.09); *A63F 13/65* (2014.09); *A63F 13/655* (2014.09); *A63F 13/213* (2014.09); *A63F 2300/6018* (2013.01); *A63F 2300/69* (2013.01); *A63F 2300/8082* (2013.01)

(58) Field of Classification Search
CPC ........ A63F 13/65; A63F 13/70; A63F 13/213; A63F 13/63; A63F 13/655; A63F 13/533; A63F 13/5375; A63F 13/577; A63F 2300/8082; A63F 2009/246; A63F 2250/287; A63F 2300/6018; A63F 2300/69; G06T 19/006
See application file for complete search history.

(56) References Cited

U.S. PATENT DOCUMENTS 7,596,473 B2 * 9/2009 Hansen ................... G06Q 10/06
446/85
7,755,620 B2 * 7/2010 Scherer ................... G06T 19/00
345/157

(Continued)

OTHER PUBLICATIONS

Legos with ARKit2 (with commentary). WWDC Keynote 2018. YouTube video. TWiT Tech Podcast Network. Jun. 4, 2018. <https://www.youtube.com/watch?v=JwSIKwuT8VI> (Year: 2018).*

(Continued)

*Primary Examiner* — William H Mcculloch, Jr.
(74) *Attorney, Agent, or Firm* — May Patents Ltd.

(57) ABSTRACT

The present disclosure integrates the worlds of physical reality and digital reality, termed Integrated-Reality, in a single gamified application. Both worlds share the same gaming environment, objectives, and context. A toy-sized structure, playfully built by the child, becomes the core of an integrated activity of designing and viewing the construction's exterior and interior, extending his physical creation into an imaginative, educational, and insightful experience, blending the real and digital worlds.

15 Claims, 11 Drawing Sheets

Main stages of the Build and Design Integrated-Reality gamified application

(56) References Cited

U.S. PATENT DOCUMENTS

| | | | |
|---|---|---|---|
| 8,751,950 B2* | 6/2014 | Loberg | G06T 15/00 |
| | | | 715/765 |
| 9,409,084 B2* | 8/2016 | Horovitz | A63F 13/655 |
| 9,595,108 B2* | 3/2017 | Horovitz | G06V 20/647 |
| 9,821,242 B2* | 11/2017 | Muthyala | A63H 33/06 |
| 9,827,507 B2* | 11/2017 | Muthyala | G06T 19/00 |
| 10,089,772 B2* | 10/2018 | Taylor | A63F 13/213 |
| 10,220,326 B2* | 3/2019 | Anderson | A63H 33/26 |
| 10,583,354 B2* | 3/2020 | Muthyala | A63H 33/042 |
| 11,083,968 B2* | 8/2021 | Walker | A63F 13/213 |
| 11,331,577 B2 | 5/2022 | Kai | |
| 11,369,864 B2 | 6/2022 | Zuniga et al. | |
| 11,393,153 B2* | 7/2022 | Yan | G06V 20/20 |
| 11,433,310 B2* | 9/2022 | Walker | A63F 13/63 |
| 11,472,112 B2* | 10/2022 | Momose | B33Y 10/00 |
| 11,478,708 B1* | 10/2022 | Holm | A63F 13/577 |
| 11,533,272 B1 | 12/2022 | Sastry | |
| 11,583,774 B2* | 2/2023 | Døssing | A63H 33/086 |
| 11,617,954 B2 | 4/2023 | Pedersen et al. | |
| 11,623,146 B2 | 4/2023 | Rispoli et al. | |
| 11,625,990 B2 | 4/2023 | Nakamura | |
| 11,712,620 B2 | 8/2023 | Bakalash | |
| 11,755,111 B2* | 9/2023 | Nickerson | G06F 3/016 |
| | | | 345/156 |
| 2005/0128212 A1* | 6/2005 | Edecker | G06T 17/05 |
| | | | 345/581 |
| 2007/0063997 A1* | 3/2007 | Scherer | G06F 3/04845 |
| | | | 345/419 |
| 2011/0298922 A1* | 12/2011 | Horovitz | A63F 13/63 |
| | | | 382/165 |
| 2014/0378022 A1* | 12/2014 | Muthyala | G06T 19/20 |
| | | | 446/91 |
| 2014/0378023 A1* | 12/2014 | Muthyala | A63H 33/042 |
| | | | 446/91 |
| 2015/0058229 A1* | 2/2015 | Wiacek | G06F 21/10 |
| | | | 705/310 |
| 2016/0253843 A1* | 9/2016 | Lee | G06T 19/006 |
| | | | 345/633 |
| 2017/0189797 A1* | 7/2017 | Muthyala | A63F 13/655 |
| 2017/0304732 A1* | 10/2017 | Velic | A63H 33/08 |
| 2018/0085682 A1* | 3/2018 | Anderson | A63H 33/22 |
| 2018/0264365 A1* | 9/2018 | Soederberg | A63F 13/655 |
| 2019/0089760 A1* | 3/2019 | Zhang | H04L 65/70 |
| 2019/0138785 A1* | 5/2019 | Olsen | A63F 13/213 |
| 2019/0240581 A1* | 8/2019 | Walker | A63F 13/533 |
| 2020/0341538 A1* | 10/2020 | Zhu | G06T 17/10 |
| 2021/0074052 A1* | 3/2021 | Ha | G06T 15/005 |
| 2021/0121782 A1* | 4/2021 | Døssing | A63F 13/65 |
| 2021/0187389 A1* | 6/2021 | Hansen | A63F 13/42 |
| 2021/0375025 A1* | 12/2021 | Yan | G06V 10/757 |
| 2022/0004671 A1* | 1/2022 | Zechlin | G06F 30/12 |
| 2022/0096947 A1* | 3/2022 | Schou | A63H 33/086 |
| 2022/0180602 A1* | 6/2022 | Hao | G06T 11/00 |
| 2022/0246061 A1 | 8/2022 | Vuong et al. | |
| 2022/0277507 A1* | 9/2022 | Park | G06T 15/005 |
| 2022/0323865 A1* | 10/2022 | Holm | A63F 13/5375 |
| 2022/0366813 A1 | 11/2022 | Shaw | |
| 2023/0056829 A1* | 2/2023 | Holm | A63F 13/577 |
| 2023/0065252 A1* | 3/2023 | Døssing | A63F 13/65 |
| 2023/0107385 A1 | 4/2023 | Salk | |
| 2023/0154115 A1* | 5/2023 | Jung | G06T 19/006 |
| | | | 345/633 |
| 2023/0158405 A1* | 5/2023 | Holm | A63F 13/5375 |
| | | | 463/31 |
| 2023/0315929 A1* | 10/2023 | Kim | G06Q 10/0631 |
| | | | 703/1 |
| 2024/0050854 A1* | 2/2024 | Bakalash | A63F 13/70 |
| 2024/0165520 A1* | 5/2024 | Bakalash | A63F 13/655 |

OTHER PUBLICATIONS

Ramel, David. Apple Boosts iOS Augmented Reality Development with ARKit 2. ADTMAG. Jun. 5, 2018. <https://adtmag.com/articles/2018/06/05/arkit-2.aspx> (Year: 2018).*

"Photorealism." Merriam-Webster.com Dictionary, Merriam-Webster, https://www.merriam-webster.com/dictionary/photorealism. Accessed Aug. 16, 2024. (Year: 2024).*

6 AI-powered Interior Design Software Solutions in 2023 https://foyr.com/learn/ai-powered-interior-design-software-tools/ (17 pages).

School Interior Design. https://envoplan.co.uk/school-interior-design-services/school-interior-design/.

Online Interior Design Classes for Kids & Teens. https://outschool.com/online-classes/interior-design.

Sebastian Santasärkkä, The Digital Games Industry and its Direct and Indirect Impact on the Economy. Case study: Supercell and Finland. Helsinki Metropolia University of Applied Sciences, 2017.

Daiki Kato, Mikie Suzuki, The Effects of Collaborative Block Creation on the Sense of Rolefulness.

Video Games, Digital Play, and the Future of the LEGO Group. https://padandpixel.com/video-games-digital-play-and-the-future-of-the-lego-group/.

R. Katz, S. Ogilvie, J. Saw, L. Woodhead; Gen Z,, "For me, online and offline are one and the same, basically the same thing, integrated" (Explained. The Art of Living in a Digital Age. Chicago Univ. Press, 2021).

Zhou, B., et al., A 10 million Image Database for Scene Recognition, 2017 (14 pages).

Jinsung Kim and Jin-Kook Lee, Stochastic Detection of Interior Design Styles Using a Deep-Learning Model for Reference Images, 2020 (20 pages).

Kato, D.; Hattori, K.; Iwai, S.; Morita, M. "Effects of collaborative expression using LEGO® blocks, on social skills and trust". Social Behavior and Personality. (2012).

Legos with ARKit2 (with commentary). WWDC Keynote 2018. YouTube video. TWIT Tech Podcast Network. Jun. 4, 2018 <http://www.youtube.com/watch?v=JwSIKwuT8VI> (Year: 2018).

Ramel, David, Apple Boosts IOS Augmented Reality Development with ARKit2. ADTMAG. Jun. 5, 2018. <http://adtmag.com/articles/2018/06/05/arkit-2.aspx> Year: 2018).

* cited by examiner

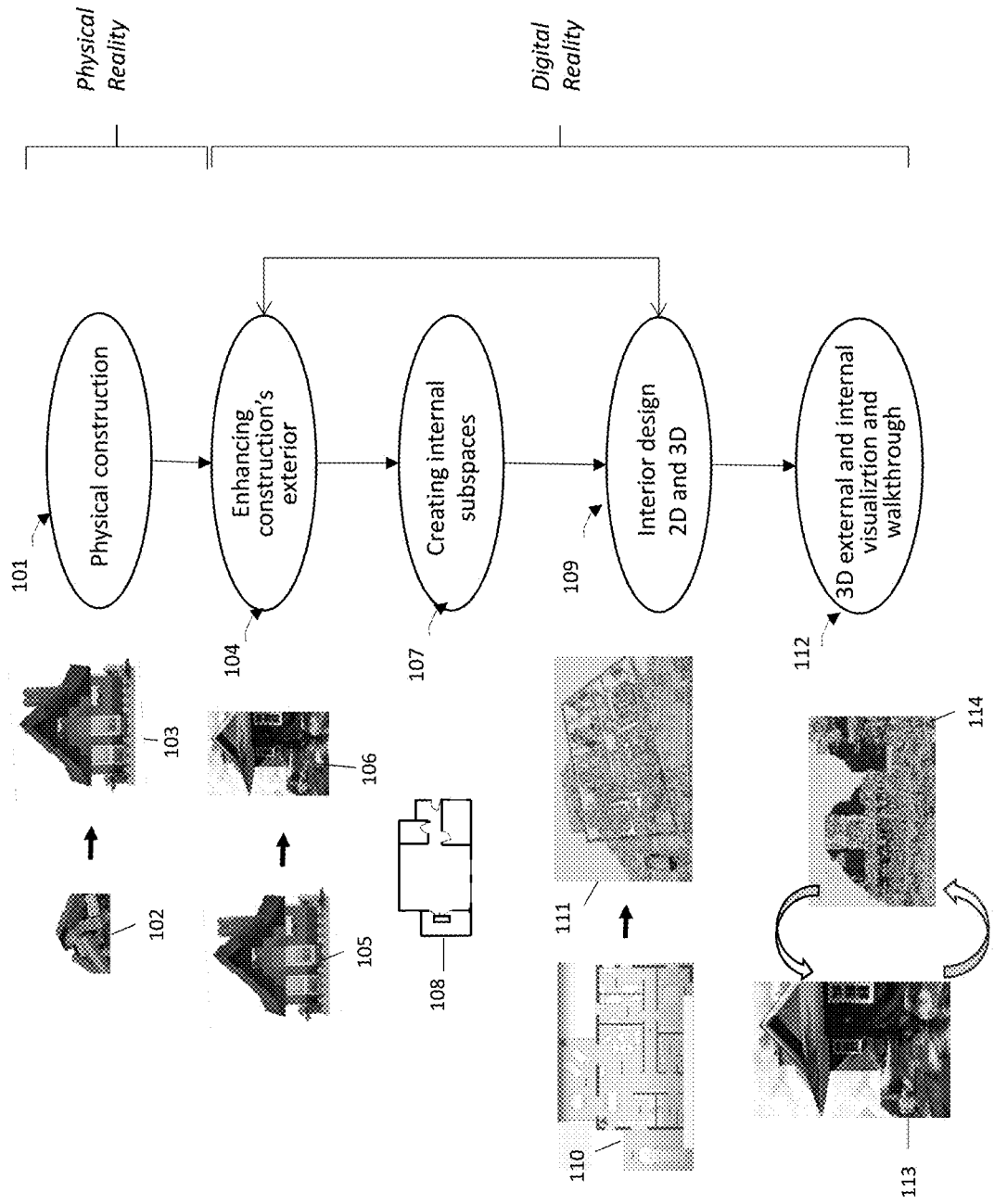
Fig. 1. Main stages of the Build and Design Integrated-Reality gamified application

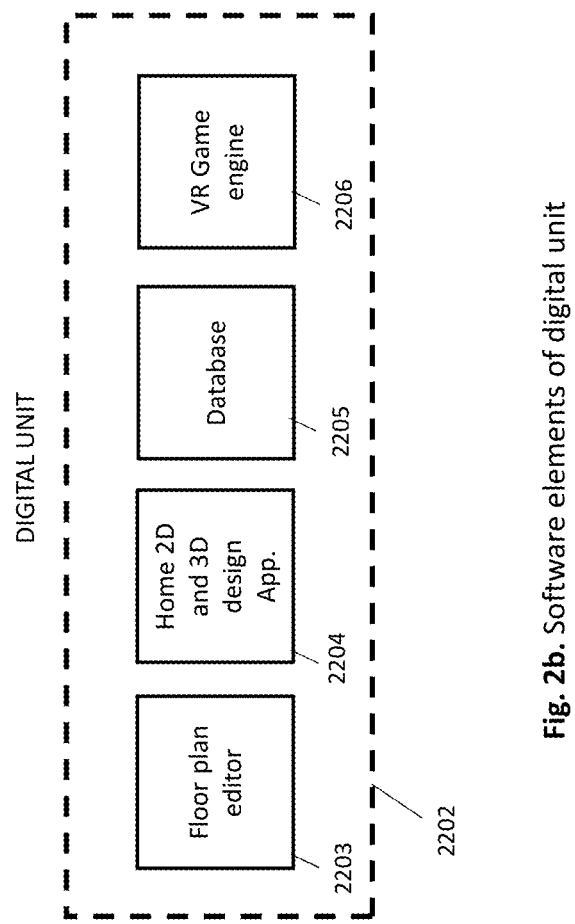
Fig. 2b. Software elements of digital unit

BUILD AND DESIGN-AN INTEGRATED-REALITY EDUCATIONAL GAMING APPLICATION

RELATED APPLICATIONS

The present application is a Continuation in Part of U.S. application Ser. No. 18/222,698 filed Jul. 17, 2023, entitled "INTEGRATED REALITY GAMING", which claims priority from U.S. Provisional Application No. 63/396,246 filed Aug. 9, 2022, entitled: "Constructible combined reality games", and which are both incorporated hereby by reference.

TECHNICAL FIELD

The present disclosure integrates physical reality and digital reality in a single gamified application.

BACKGROUND

Integrated-Reality. The postmillennial generation of kids, born in the Internet era, take the Internet and related digital networks and tools for granted; technology and online activities are incorporated into everything. As one of the young put it, "For me, online and offline are one and the same, basically the same thing, integrated" (R. Katz, S. Ogilvie, J. Saw, L. Woodhead; Gen Z, *Explained. The Art of Living in a Digital Age*. Chicago Univ. Press, 2021), which is fully incorporated hereby by reference. Postmillennial generations (Gen Z) are distinguishable from their elders, including the pre-Internet generation usually called millennials or Gen Y, precisely because they have never known life without the Internet. Computer gaming became a key component of the online activities of Gen Z. From 2000 to the present (the Online Boom) was the rise of the internet and mobile, which grew the computer gaming industry from tens of billions to hundreds of billions in revenue. The tidal wave of digital gaming has only continued to swell and become a key factor of the Integrated-Reality concept.

However, some of the pre-internet generations of legacy games, such as the plastic-bricks construction game of LEGO®, remain an independent and necessary mainstay of full-reality gaming. Jorgen Vig Knudstorp, the LEGO® CEO, has compared LEGO® to books: "Just as children still want to read books, they still want to have the physical LEGO® experience that cannot be replaced by digital play."

Therefore, for the future generations, born into the dual world of physical and digital reality, there is a great need to bridge the pre-internet legacy games and digital gaming worlds, by way of Integrated-Reality (IR).

Computer Aided Architectural Design (CAAD) systems in general cover a design of the building, exterior and interior. They employ a database with geometric and other properties of objects; they all have graphic user interface to manipulate a visual representation rather than the database; and they are all more or less concerned with assembling designs from standard and non-standard pieces. CAAD lies in the domain knowledge (architecture-specific objects, techniques, data, and process support) embedded in the system. It has an explicit object database of building parts and construction knowledge, supports the creation of architectural objects. It also refers to the use of software which is specifically developed for the computer animation industry (e.g. Maya and 3DStudio Max), is also used in architectural design. These programs can produce photo realistic 3d renders and animations. Many kinds of expert knowledge, tools, visualization techniques, and media are to be combined.

Interior design software assists in developing and/or enhancing the interior of a building to achieve a pleasing environment. Interior design is a profession that includes conceptual development, space planning, research, through the elements of form, space, texture, pattern, line, and light.

Architectural and interior design software doesn't have to be complicated. It can be a lot of fun, and at the same time provide valuable knowledge and stimulate creative thinking, virtual thinking, and geometry. There are numerous design applications to use for schools to create floor plans and home designs for children (e.g., Sketchup, RoomSketcher, etc.).

Artificial Intelligence for architectural and interior design. Machine Learning (ML) algorithms, as a subfield of Artificial Intelligence, build a model based on sample data, known as training data, to make decisions or designs without being explicitly programmed. Some implementations of machine learning use data and neural networks in a way that mimics the working of a biological brain.

Generative adversarial networks (GANs) are used to generate 2D and 3D designs. GANs technologies are used to generate designs based on different architectural styles. The GANs-based method is used to produce unforeseen interior architectural designs that may or may not have arisen for human architects. GANs may require significant computational resources and time, but they may be affordable for architects without coding experience.

In the architectural and interior design domain, researchers have proposed AI approaches for the recognition of design-related information in images. Zhou, B., et al. [*Places: A* 10 *million Image Database for Scene Recognition*, 2017], which is fully incorporated hereby by reference, constructed a large image database of outdoor and indoor locations for machine learning and provided the source code and weights for a model trained on their database. Their database contains approximately 10 million images representing more than 400 space categories. Liu, X., et al. [*Stochastic Detection of Interior Design Styles Using a Deep-Learning Model for Reference Images* 2019] used deep learning to explore interior design trends in different regions. Moreover, Kim, J. and Lee, J.-K., [*Stochastic Detection of Interior Design Styles Using a Deep-Learning Model for Reference Images,* 2018] implemented auto-recognition of room usage in indoor images of apartments in South Korea as a component of an intelligent management system for interior reference images. Kim, J. et al. [*Stochastic Detection of Interior Design Styles Using a Deep-Learning Model for Reference Images,* 2020] developed an interior design using a deep-learning model for reference images, and is fully incorporated hereby by reference.

Gamification is a technology that incorporates elements of gameplay in nongame situations. It is used to engage customers, students, and users in the accomplishment of quotidian tasks. Gamification is using game design elements in non-game contexts, such as education, and others. The use of educational games as learning tools is a promising approach due to their ability to teach and reinforce knowledge and important skills such as problem-solving, collaboration, and communication. Games have remarkable motivational power; they utilize several mechanisms to encourage people to engage with them, often without any reward, just for the joy of playing and the possibility to win. As opposed to using elaborate games requiring a large amount of design and development efforts, the educational gamification approach suggests using game thinking and game design elements to improve learners' engagement and motivation.

Educational gamified applications are explicitly designed for educational purposes or have incidental or secondary educational value. Educational games are games that are designed to help transmit knowledge or foster skills and character traits.

Interior design education is the teaching of skills and information needed to perform interior design work. An interior design education will teach students how to draw and to plan out a space, and will cover design software. Education includes consideration for the design brief, design processes from concept to scheme development and implementation. There are number of different routes to attain qualifications in interior design. This disclosure focus on an educational gamification approach that combines designing and building, using game thinking and game construction, and design elements to improve learners' engagement and motivation.

SUMMARY OF THE DISCLOSURE

The present disclosure integrates the worlds of physical reality and digital reality, termed Integrated-Reality, in a single gamified application. Both worlds share the same gaming environment, objectives, and context. A toy-sized structure, playfully built by the child, becomes the core of an integrated activity of designing and viewing the construction's exterior and interior, extending his physical creation into an imaginative, educational, and insightful experience, blending the real and digital worlds.

Physical reality is focusing on the strength of timeless brick technology, free of digital technology and its influences. The toy-sized structure, built of bricks, may be chosen according to the objectives of a gamified application (such as a country house, a city building, the world's famous buildings, temples, museums, and cultural centres). The physical building effort generates an intimate familiarity with the constructed model. Since the physically constructed model comprises the plastic-bricks exterior only, in the digital phase that exterior is covered by the player with architectural coating materials, and its interior is designed from scratch using architectural computing application, with the assistance of AI. As it is for educational purposes, the architectural and interior design may be simplified, bringing a lot of fun, and at the same time providing valuable knowledge and stimulating creative thinking, virtual thinking, and geometry.

On top of the physical reality structure, a digital reality level allows converting the brick-built structure into virtual "real looking" exterior, designing an interior of the structure, and performing a live 3D visualization of the exterior as well as the interior.

The integration of physical and digital realities brings important benefits from both words to the player. On the one hand, constructing a real structure develops visual-spatial ability, improves hand and eye coordination, and trains the eyes and hands. On the other hand, digital reality enhances engagement, knowledge retention, learning outcomes, teamwork, social skills, and empathy.

Various physical brick-based models can be paired with limitless interior designs, producing wide-ranging environments and visualizations, where physical and digital objects interact throughout the construction game.

BRIEF DESCRIPTION OF THE DRAWINGS

For a better understanding of the embodiments and to show how they may be carried into effect, reference will be made, purely by example, to the accompanying drawings.

With specific reference now to the drawings in detail, it is stressed that the particulars shown are by way of example and for purposes of illustrative discussion of selected embodiments only and are presented in the cause of providing what is believed to be the most useful and readily understood description of the principles and conceptual aspects. In this regard, no attempt is made to show structural details in more detail than is necessary for a fundamental understanding; the description taken with the drawings makes apparent to those skilled in the art how the several selected embodiments may be put into practice.

Embodiments are directed toward the integration of physical reality and digital reality worlds in gaming. In this context, physical reality refers to a physical place where the player must be there to see it, and everyone presents sees essentially the same thing. In contrast, digital reality refers to an environment created by computer software, where a player is remote from physical space but feels like he is in physical space. The player may also be able to see shared experiences with other players and/or see content unique to the individual.

As used in this specification, the singular indefinite articles "a", "an", and the definite article "the" should be considered to include or otherwise cover both single and plural referents unless the content clearly dictates otherwise. In other words, these articles are applicable to one or more referents. As this specification uses, "or" is generally employed to include or otherwise cover "and/or" unless the content dictates otherwise.

As used in this specification, the term "gamified application" may include the terms "educational gamified application" or "game". The term "exterior architecture" refers to covering the walls and roof of a plastic-brick construction with coating materials giving it a shape of a real building. The term "interior architecture" is the design of an interior for a given shell (exterior) of the building concerned. It refers to the design and plan used for a building's interior in architectural terms, to accommodate a gaming environment. The term "interior design" (also "floor plans and home design") is the art of enhancing the interior of a building to achieve an appropriate environment for the gaming space, including conceptual development, space planning, and interior decoration.

Figure 2A:
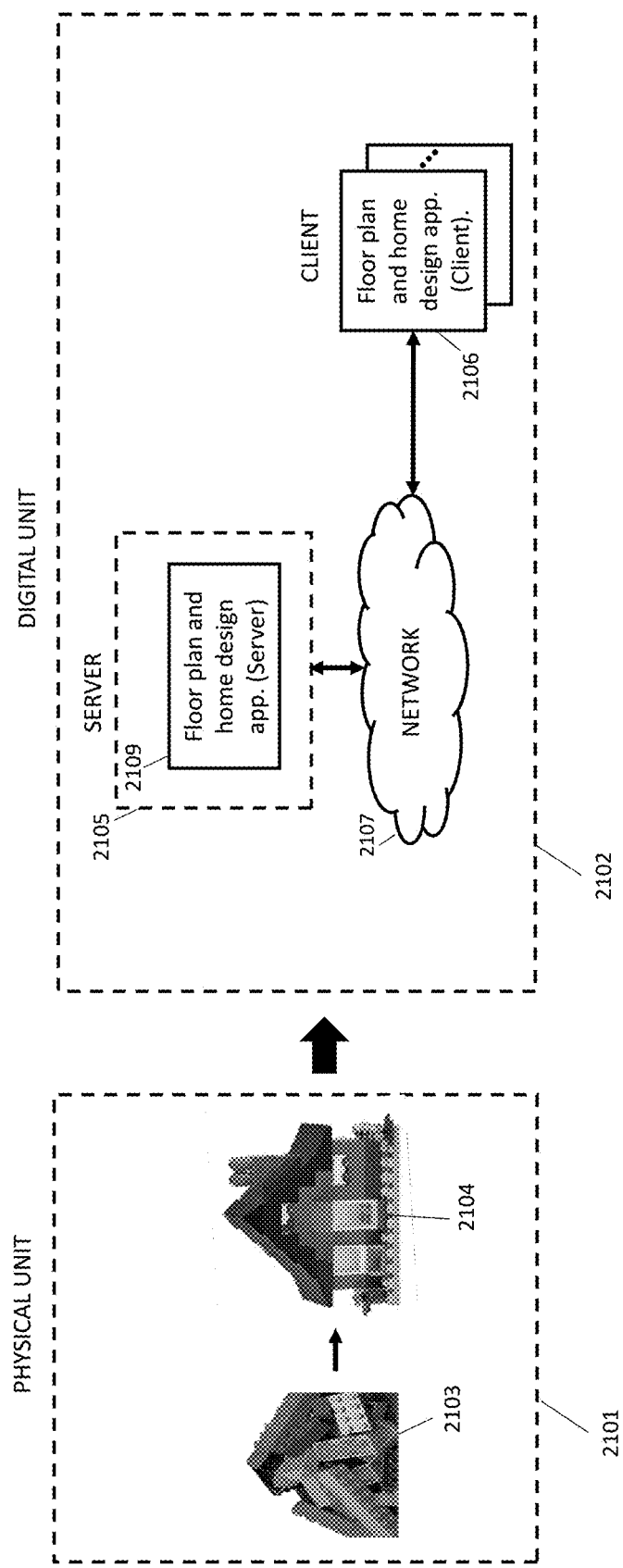
Figure 3A:
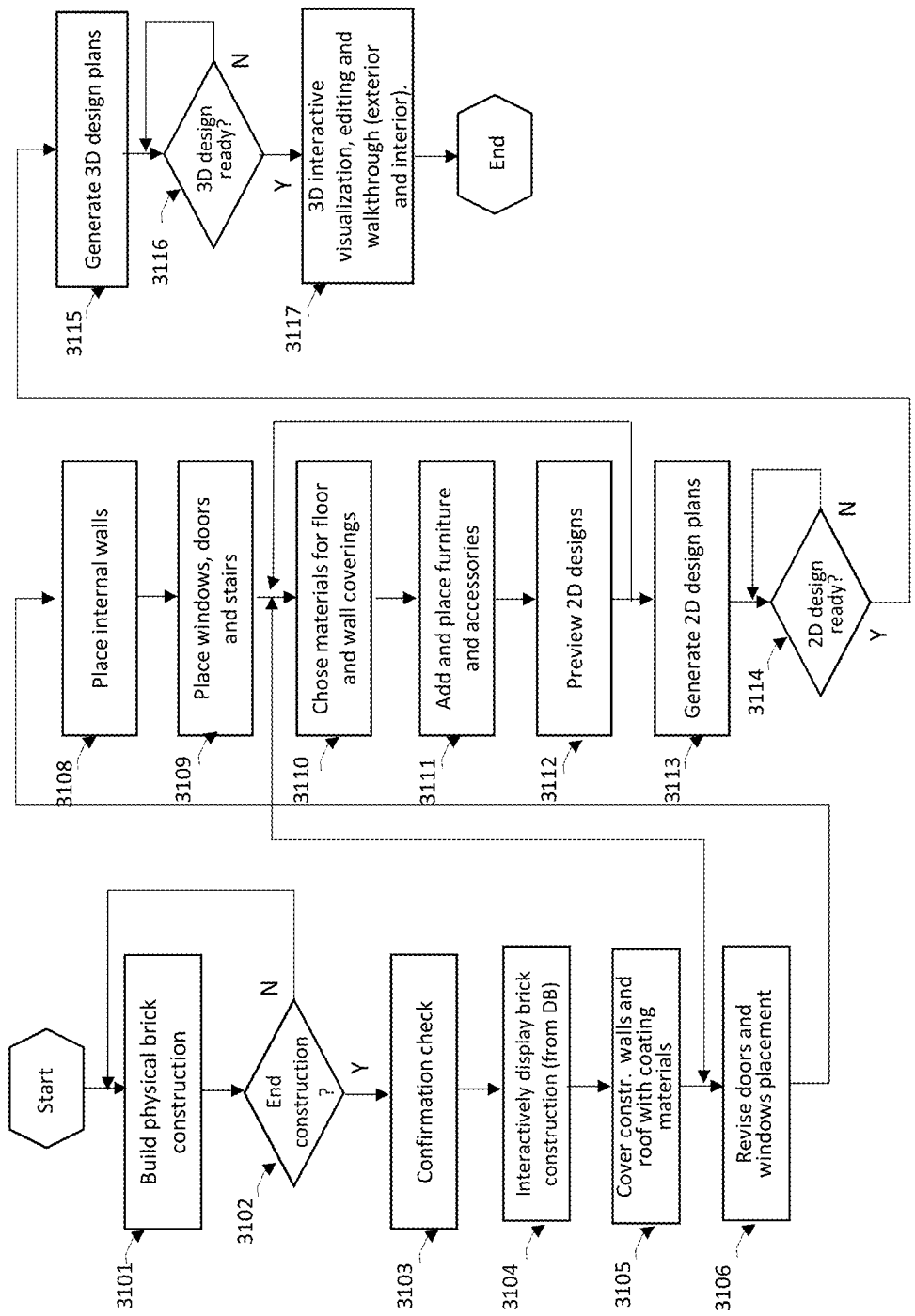
Figure 3B:
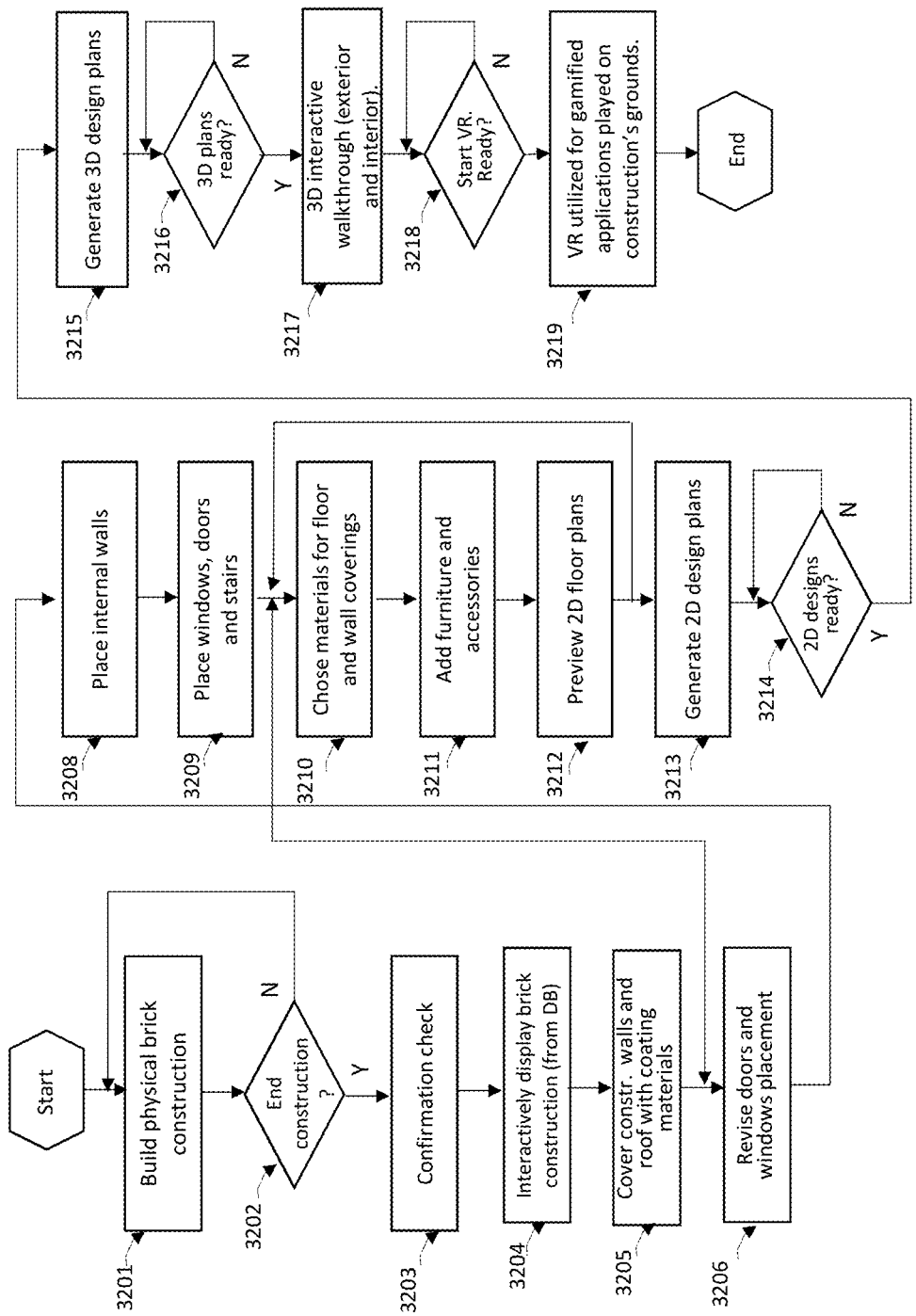
Figure 4:
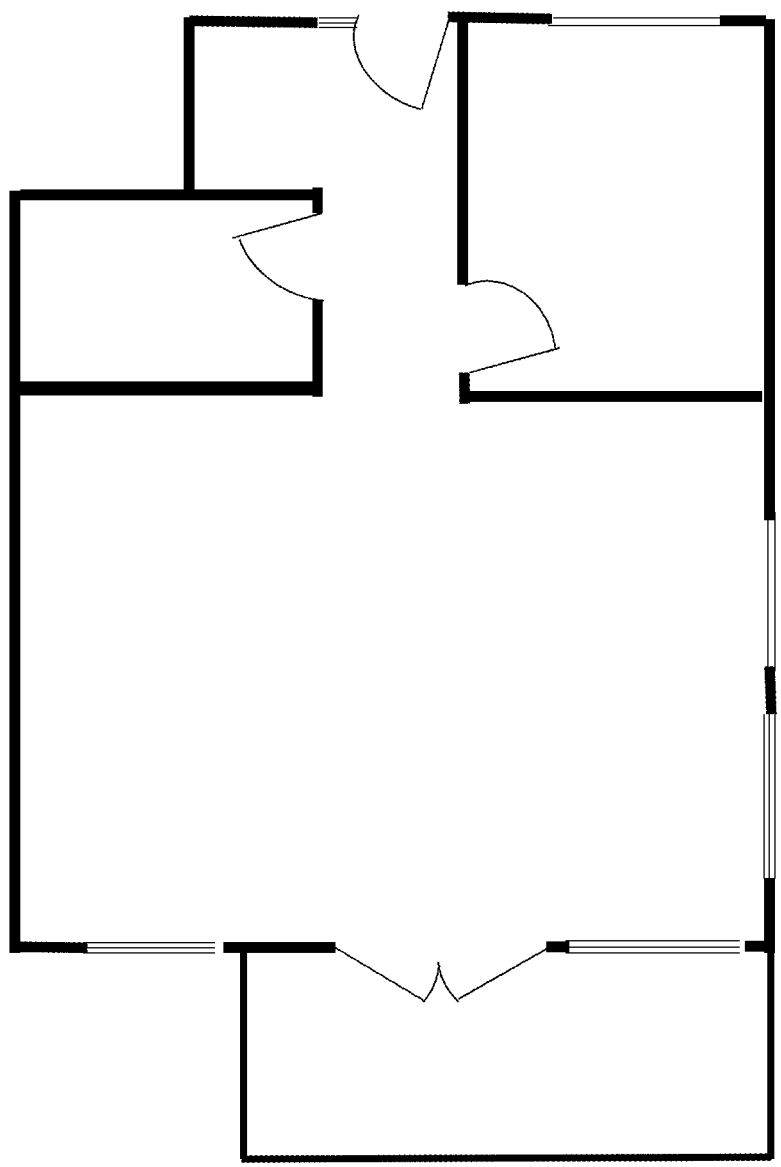
Figure 5:
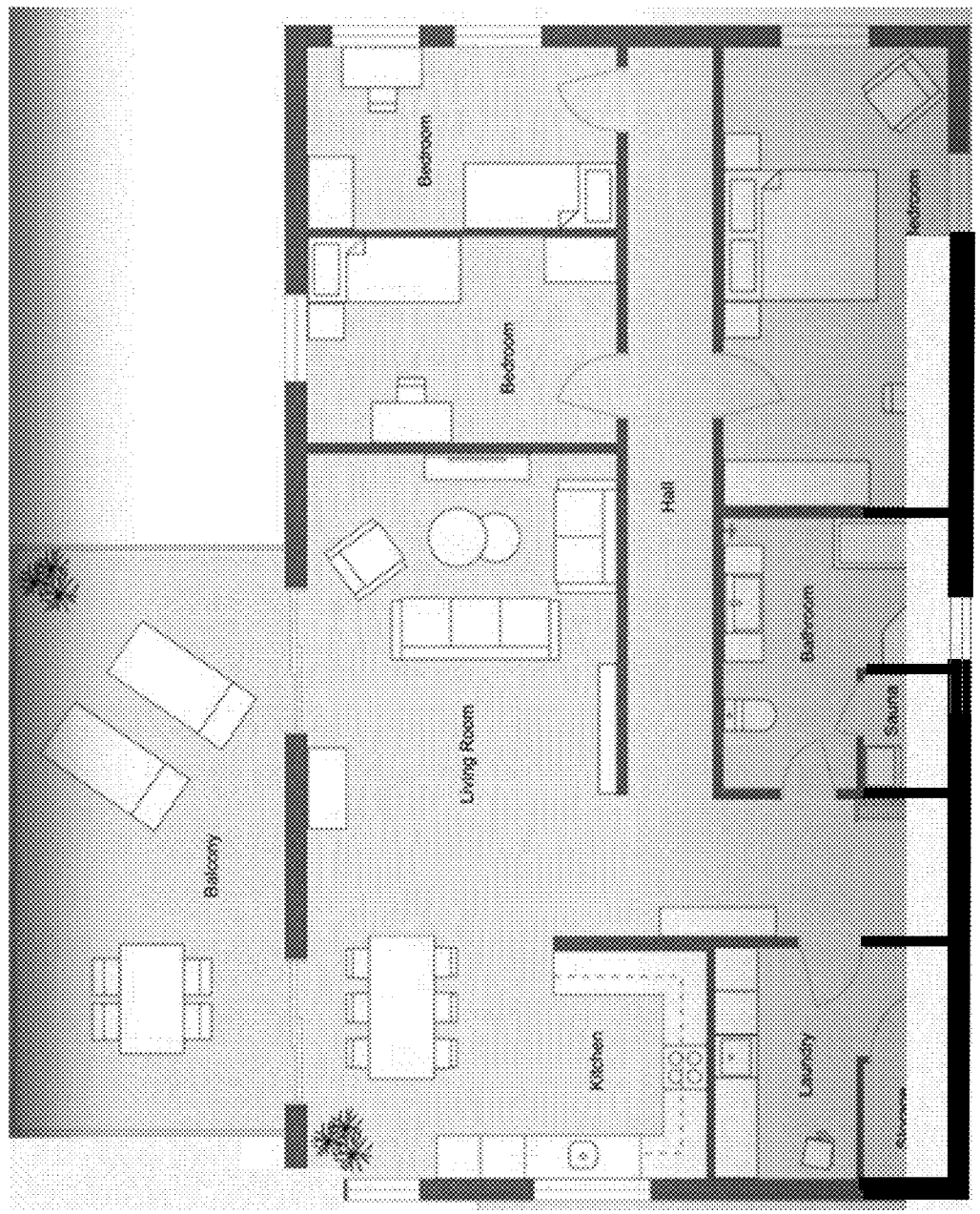
Figure 6:
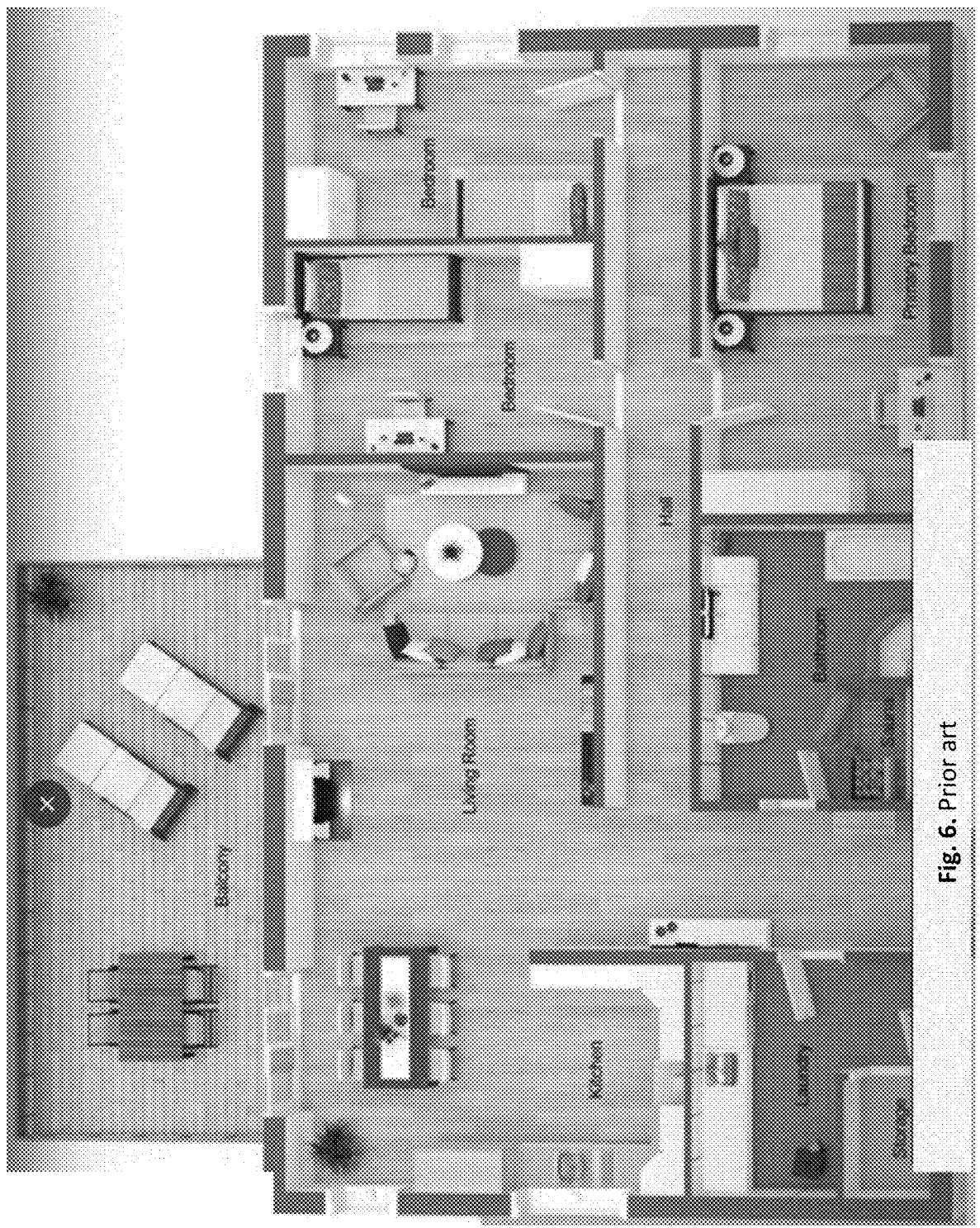
Figure 7A:
Figure 7B:
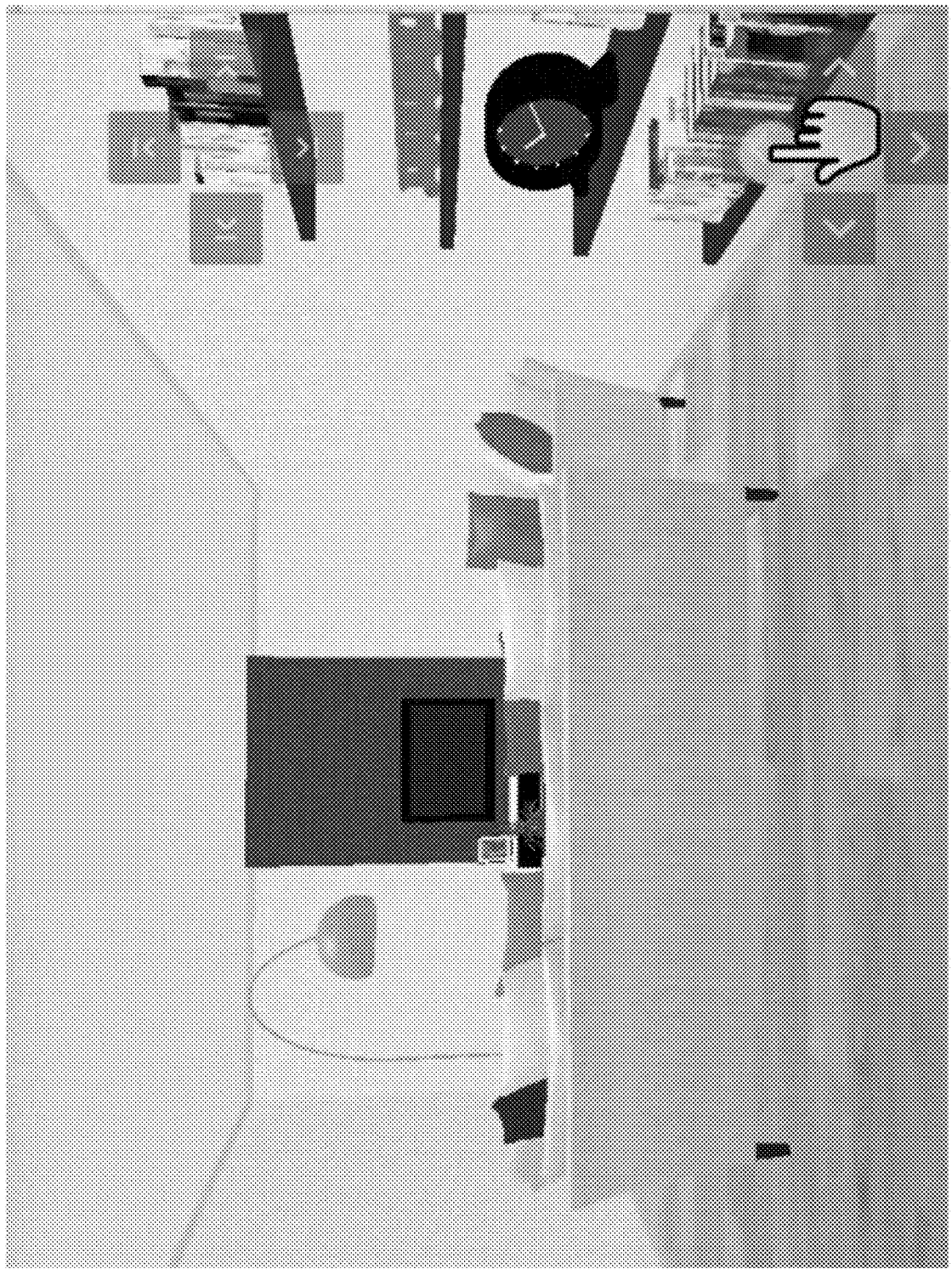
Figure 8:
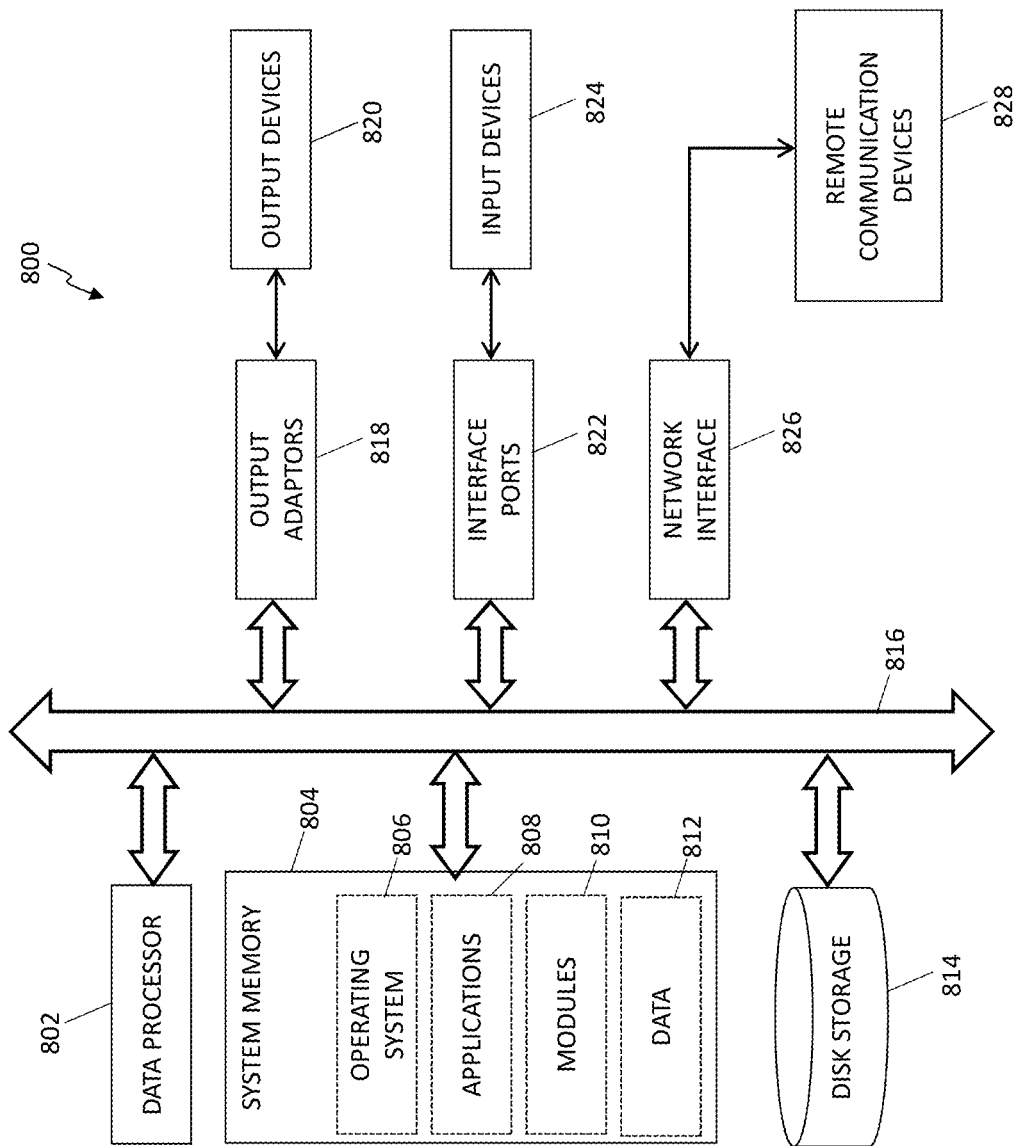

In the accompanying drawings:

FIG. 1. illustrates the main stages of a Build and Design Integrated-Reality gamified application, played by a player in accordance with an exemplary embodiment;

FIG. 2a. illustrates a schematic representation of physical and digital-software units, in accordance with an exemplary embodiment;

FIG. 2b. illustrates a schematic representation of physical and digital-system units, in accordance with an exemplary embodiment;

FIG. 3a. illustrates a flowchart of a Build and Design Integrated-Reality gamified application, concluded by 3D visualization, in accordance with an exemplary embodiment;

FIG. 3b. illustrates a flowchart of a Build and Design Integrated-Reality gamified application, in accordance with an exemplary embodiment;

FIG. 4. Prior art. Illustrates an exemplary drawing of internal subdivision created during the stage of designing interior spaces, in accordance with an exemplary embodiment;

FIG. 5. Prior art. Illustrates an exemplary product of the 2D interior design stage, in accordance with an exemplary embodiment;

FIG. 6. Prior art. Illustrates an exemplary product of the 3D interior design stage, in accordance with an exemplary embodiment;

FIG. 7a. Illustrates an exemplary 3D perspective created with an interior design product, in accordance with an exemplary embodiment;

FIG. 7b. Illustrates an exemplary 3D walkthrough perspective created with an interior design product, in accordance with an exemplary embodiment;

FIG. 8. Illustrates a block diagram of an exemplary system for implementing various aspects of the disclosure.

DETAILED DESCRIPTION OF THE DISCLOSURE

To mark the difference between gaming media in this context: Physical Reality takes place completely in the physical place where the player must be there to see it, and everyone present sees essentially the same thing. As used in the present disclosure, the term Digital Reality can take place in architectural and interior design as well as in fictional world of Virtual Reality. Design is done first in 2D and then visualize in 3D. 3D visualization makes you able to clearly see your designs as you design, while also being the way to present the finished results. Virtual Reality, a prominent sub-category of digital reality, can be referred to as a technology that allows for replacing the real world with a synthetic one, making the user believe that she/he is in another realm. It involves a set of technologies that are used to create computer-generated virtual environments where users can experience and interact just as they would in real life. The characteristics of architectural and interior design as well as VR make them a relevant technology for gaming purposes. Gaming is, however, not only restricted to entertainment but has been expanded to different fields, mainly with the purpose to learn or train through gaming, usually referred to as edutainment, educational gaming applications, or serious games.

Build and Design Integrated-Reality (BDIR) gaming application consists of two levels: Physical Reality and Digital Reality. The first, the Physical Reality level, is focusing on the strength of timeless legacy brick technology, innovating within the core technology, and may have been free of digital gaming influences. It is a basic offline physical construction of a plastic-brick structure (house, building, etc.), constructed and played in full reality.

According to some embodiments of the present disclosure the construction may be built out of a set of standardized brick pieces that allow for the construction of a variety of different models. The pieces avoid the lead time of requiring special training or design time to construct complex systems. This makes them suitable for temporary structures. One very popular brand is LEGO®, however, other manufacturers are available as well, categorized according to pieces connection method and geometry.

Children benefit a lot from building plastic brick structures. Playing with LEGO® and other construction toys builds multiple physical skills. Manipulating the pieces helps to develop hand-eye coordination, training the eyes and hands to work together, bilateral integration—where the two sides of the body (or two hands) learn to work together, and develops visual-spatial ability.

Children who complete models using toy building blocks have much better spatial ability than children who do not complete such models. Toy construction play is also beneficial for autistic children when incorporating individual and/or group play with building blocks. Autistic children who played with building blocks were motivated to initiate social contact with children of their age, able to maintain and endure contact with those children, and were also able to surpass the barriers of being withdrawn and highly structured. Construction toy play is beneficial for building social skills and building trust in others because it acts as a collaborative task where individuals have to cooperate to finish the task-building an object, for example. (Kato, D.; Hattori, K.; Iwai, S.; Morita, M. (2012). "*Effects of collaborative expression using LEGO® blocks, on social skills and trust*". Social Behavior and Personality. 40 (7)), which is incorporated hereby by reference.

Digital Reality level comes on top of Physical Reality. The physical model turns out to be a playground for digital reality. Physical models built out of plastic-bricks have only hidden interiors. One can say that there are exteriors only. Interiors can only be created digitally, starting from scratch: creating internal subspaces. Therefore, creating the model's interior comprises two steps, creating internal subspaces (rooms, halls, staircases, passages, etc.), and then designing with interior design tools. For this end the player learns and applies interior design tools (2D and 3D) for design and visualization. For children, understanding space planning and experimenting with those tools can be playful and challenging.

In addition to designing interiors, an enhanced exterior of the model can be redesigned as well. The player may cover up the digital version of the plastic-brick model with realistic, customary materials (marble, wood, red bricks, roofing tiles, etc.), replacing its plastic-brick look with a realistic look.

Digital enhancement and interior design of the physically created construction greatly boosts children's benefits and interests. It can enhance engagement, knowledge retention, learning outcomes, teamwork, social skills, and empathy. An exploration of the design results by way of 3D interaction and virtual reality fully immerses students and completely focuses their senses on the teaching topic. When experiencing topics as if they are real, students' brains create clear, detailed mental maps, helping to improve knowledge retention.

Reference now is made to FIG. 1, showing a block diagram of main stages of the Build and Design Integrated-Reality gamified application. There is one stage 101 of physical reality followed by four subsequent stages of digital reality 104, 107, 109, 112. The physical reality part of the IR gaming application may be supplied as a kit of plastic interlocking bricks 102 for a physical construction of an architectural model, including all the parts needed to complete the model 103.

At the first, physical construction stage 101, the player builds a toy construction (e.g., house, building, etc.), out of interlocking plastic bricks 102 (or other building pieces, such as wooden bricks, wooden cubes, etc.). A set of such interlocking pieces would be assembled and connected by the player to build the toy construction. One or more players can take part in this physical cycle. No digital technology is involved in this stage. Using pieces avoid the lead time of requiring special training or design time to construct complex systems. This makes them suitable for the required structures. One very popular brand is LEGO®, however, other manufacturers are available as well, categorized according to pieces connection method and geometry.

Once the physical model is completed, the upcoming digital stages are played on the constructed playground utilizing a computing system such as cellular phone, laptop, desktop, custom made hardware, all possibly supported by a data centre.

The next, exterior architecture stage 104, is a digital enhancement on the plastic-brick construction's exterior, covering the walls and roof with coating materials, giving it the shape of a real building. The player covers up the plastic brick surface of the structure's exterior with realistic, customary materials (marble, wood, red bricks, roofing tiles, etc.). The plastic brick structure 105 gets a virtual appearance of a real building 106. This may include landscape and gardening as well. The next stage 107 deals with the structure's empty interior. The player, using architectural software tools divides the internal space into subspaces (rooms, halls, staircases, passages, etc.) 108. Then the player succeeds to the interior design stage 109, performing a precise design of the internal subspaces utilizing interior design and visualization tools, 2D 110 and then 3D 111.

The last stage 112 is a comprehensive live interaction allowing a virtual walkthrough of the player inside and outside the redesigned building, as an effective way to let the player clearly see the finished results of his design. This can be done either by applying only 3D interactive visualization, or on top of it utilizing Virtual Reality environment for a gamified application played on construction's grounds. In either case, once the design is completed, the player can move freely between inside 114 and outside 113 the redesigned structure, exploring his own creation.

The physical construction stage as well as the 3D external and internal interaction stage, or gaming in the VR environment, can be played by more than one player. On the other hand, the interior design is more effectively performed by an individual player.

Reference now is made to FIG. 2a, which presents a schematic representation of Integrated Reality gaming system, comprising its physical unit 2101 and digital unit 2102, in which the systems and methods of the present disclosure may be implemented and executed.

The physical unit 2101 is concerned with building a toy size construction (e.g., house, building, etc.), of interlocking plastic bricks 2103 (or other building pieces, such as wooden bricks, wooden cubes, etc.). A complete set of such interlocking pieces can be supplied to the player for constructing a physical model, possibly assisted with assembling instructions. Such a constructed model typically consists of an exterior, but it lacks an explicit interior. Therefore, creating and designing the interior becomes the main theme of digital gaming unit 2102. During digital gaming the player creates floor plans (rooms, doors, windows, etc.), and then home designs.

Digital unit consists of software elements as presented in FIG. 2b. Floor plan editor 2203 and home and design application 2204, a suite of editing tools and an intuitive and simplified user interface make this an intuitive and friendly educational design instrument, allowing children players design and draft plans with 2D and 3D geometry. Database 2205 with geometric and other properties of objects (e.g. coating materials, furniture, accessories, etc.) supplies elements for assembling designs from standard and non-standard pieces. An optional element of digital unit is virtual reality game engine 2206. It creates photorealistic images of the interior and exterior of the construction, based on the designed results. It can make a user feel like he is inside the house construction. It produces images, sounds and games so that the user feels like being really part of the construction, and can play a game.

Back to FIG. 2a. The digital gaming system may be implemented by a client-server computing architecture. A computing server is a piece of computer hardware or software that provides functionality for other programs or devices, called "clients". This architecture is called the client-server model. Servers can provide various functionalities, often called "services", such as sharing data or resources among multiple clients or performing computations for a client. A single server can serve multiple clients. A client process may run on the same device or may connect over a network to a server. In the case of Build and Design Integrated-Reality gamified application of present disclosure the use of a server ensures the client that changes to the design occur rapidly. This category of software as a service puts an emphasis on usability and speed.

Clients and server communicate over a computer network 2107. Typically, they are on separate computers, however, in some embodiments both client and server may reside on the same computer, without the need of network. A network may consist of any network that enables communication between or among systems, machines, repositories, and devices (e.g., between the server 2105 and the clients 2106). Accordingly, a network may include one or more portions that constitute a private network, a public network (e.g., the Internet), or any suitable combination thereof. Network may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a Wi-Fi network or WiMAX network), or any suitable combination thereof. Any one or more portions of network 2107 may communicate information via a transmission medium. As used herein, "transmission medium" refers to any intangible (e.g., transitory) medium that can communicate instructions for execution by a machine and includes digital or analogue communication signals or other intangible media to facilitate communication of such software.

The floor plan and home design client devices 2106, comprise computing devices such as, but not limited to, personal or desktop computers, laptops, notebooks, handheld devices such as smartphones, tablets, gaming consoles and/or any other computing platform known to persons of ordinary skills in the art. Mobile device (smartphone) is a portable device that combines mobile telephone and computing functions into one unit. They are distinguished from feature phones by their stronger hardware capabilities and extensive mobile operating systems, which facilitate wider software, Internet (incl. WEB browsing over mobile broadband), and multimedia functionality (including music, video, cameras, AR, and gaming). However, a smartphone may be replaced or assisted by a tablet computer, a vehicle computer, or a wearable device. The floor plan and home design part residing in server 2109 typically includes the heavier parts of design software, such as generating 2D and 3D designs, and 3D interactive visualization and walkthrough.

Reference now is made to FIG. 3a, which presents a flowchart of an Integrated Reality gaming system of present disclosure, concluded with a 3D interactive walkthrough, enabling the designer to explore his own creation. Firstly, the player builds a physical brick construction 3101 (e.g. FIG. 1, 101). When the player completes the building task, he prompts the digital gaming system 3102. The construction completion may be confirmed in some digital way, e.g. by taking a photo of the construction by cellular phone, and then applying image recognition, checking with a corresponding model in database 3103. The exterior design phase 3104 starts with presenting a digital model of the brick-based construction (e.g. FIG. 1, 105) comprising its exterior only, letting the player to use architectural design to convert it to realistically looking construction (e.g. FIG. 1, 106) (and possibly design a garden for the house as well). The designer covers the construction's walls and roof with coating materials and roofing tiles 3105. The variety of coating materials is proposed by the architectural application. Although the original location of external doors and windows is given as part of a priory physical construction, it can be revisited later during creation of internal subspaces 3106. The creation of internal subspaces is done dividing the internal space 3108, placing internal walls, placing windows, doors, and stairs 3109. A priory external objects (windows, doors, and stairs) may undergo a revision, by updating the step 3106 is necessary.

The interior design phase starts with choosing materials for floor and wall coverings 3110. Then furniture and accessories are picked interactively from database and placed 3111. A preview of the so far plans can be seen anytime as 2D geometry images 3112. When the previews are satisfactory, final 2D floor plans are generated 3113. This step may take some time 3114. FIG. 5 shows an example of a complete 2D interior design.

Transition to 3D design perspectives, editing and interactive visualization is done in the next step 3115 and 3116. This step may take some time, depending on the computing platform. 3D interior design perspectives represent a fully furnished and decorated room including lighting, textures, and materials from a 3D perspective. By converting 2D designs into three-dimensional models, player can now interactively explore spaces from multiple perspectives 3117, allowing him to make informed decisions about layout, lighting, materials, and colors. The 3D perspectives and 3D interaction are created by a graphics module of Home 2D and 3D design Application (FIG. 2, 2204). They are based on imported 2D data and plans, and on detailed information on furniture and accessories as held in the database. An example of a 3D design perspective is shown in FIG. 6, and an image of a 3D design perspective in FIG. 7a. FIG. 7b shows a state of live interaction with designed interior, allowing the player to watch the interior with great details from arbitrary viewpoints within the redesigned construction.

Reference now is made to FIG. 3b, which presents a flowchart of a Build and Design Integrated Reality gaming system of present disclosure, including a VR session of gamified applications played on the digital construction's grounds. The main body of the flowchart 3201-3217 is identical to 3101-3117 of FIG. 3a, as described above. The virtual reality gaming is conducted by the VR game engine 2206 of FIG. 2b. When prompted 3218, a photorealistic visualization of the redesigned construction is automatically prepared. When done, the VR system is ready for playing VR gamified applications. Applying Integrated Reality gaming enables the gamer or a group to extend the Bild and Design creation to an imaginative and insightful gaming experience, blending the real and fictive worlds. A detailed description can be found in the U.S. application Ser. No. 18/222,698, which is fully incorporated hereby by reference.

The VR stage 3219 allows immersive gaming on the predesigned grounds. VR is a simulated experience that gives the user a feel of real world. Typically, VR uses special headsets, nevertheless computer or mobile phone screens can be used as well. VR generates realistic images that simulate user's physical presence in virtual environment. A player using VR can look around the digital world and move around it, even interact with virtual features or items. VR greatly boosts educational benefits and interests. It can enhance engagement, knowledge retention, learning outcomes, teamwork, social skills, and empathy. Virtual reality fully immerses students and completely focuses their senses on the teaching topic. When experiencing topics as if they are real, students' brains create clear, detailed mental maps, helping to improve knowledge retention.

FIG. 8 illustrates an exemplary system 800 for implementing various aspects of the disclosure. System 800 includes a data processor 802, a system memory 804, and a system bus 816. The system bus 816 couples the system components including, but not limited to, the system memory 804 to the data processor 802. The data processor 802 can include one or more of any of the various available processors. The data processor 802 refers to any integrated circuit or other electronic devices (or collection of devices) capable of operating on at least one instruction, including, without limitation, Reduced Instruction Set Core (RISC) processors, CISC microprocessors, Microcontroller Units (MCUs), CISC-based Central Processing Units (CPUs), Digital Signal Processors (DSPs), Graphics processing unit (GPU), and General-purpose graphics processing unit (GPGPU). Furthermore, various functional aspects of the data processor 802 may be implemented solely as software or firmware associated with the processor. Dual microprocessors and other multiprocessor architectures also can be employed as the data processor 802.

The system bus 816 can be any of several types of bus structure(s) including the memory bus or memory controller, a peripheral bus or external bus, and/or a local bus using any variety of available bus architectures known to those of ordinary skill in the art.

The system memory 804 may include computer-readable storage media comprising volatile memory and nonvolatile memory. The non-volatile memory stores the basic input/output system (BIOS), containing the basic routines to transfer information between elements within the system 800. Nonvolatile memory can include but is not limited to, read-only memory (ROM), programmable ROM (PROM), electrically programmable ROM (EPROM), electrically erasable programmable ROM (EEPROM), or flash memory. The volatile memory includes random access memory (RAM), which acts as external cache memory. RAM is available in many forms such as static RAM (SRAM), dynamic RAM (DRAM), synchronous DRAM (SDRAM), double data rate SDRAM (DDR SDRAM), enhanced SDRAM (SDRAM), SynchLink™ DRAM (SLDRAM), Rambus® direct RAM (RDRAM), direct Rambus® dynamic RAM (DRDRAM), and Rambus® dynamic RAM (RDRAM).

The system memory 804 includes an operating system 806 which performs the functionality of managing the system 800 resources, establishing user interfaces, and executing and providing services for applications software. System applications 808, modules 810, and data 812 provide various functionalities to system 800.

System 800 also includes disk storage 814. Disk storage 814 includes, but is not limited to, devices like a magnetic disk drive, floppy disk drive, tape drive, Jaz drive, Zip drive, LS-100 drive, flash memory card, or memory stick. In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). A user enters commands or information into system 800 through input device (s) 824. Input devices 824 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input device 824 connects to the data processor 802 through the system bus 816 via interface port(s) 822. Interface port(s) 822 include, for example, a serial port, a parallel port, a game port, and a universal serial bus (USB).

The output devices 820 like monitors, speakers, and printers are used to provide the output of the data processor 802 to the user. Another example is a USB port that may be used as an input device 824 to provide input to system 800 and output information from system 800 to output device 820. The output device 820 connects to the data processor 802 through the system bus 816 via output adaptor 818. The output adapters 832 may include, for example, video and sound cards that provide a means of connection between the output device 820 and the system bus 816.

System 800 can communicate with remote communication devices 828 for exchanging information. The remote communication device 828 can be a personal computer, a server, a router, a network PC, a workstation, a microprocessor-based appliance, a mobile phone, a peer device, or another common network node and the like.

Network interface 826 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereof, packet switching networks, and Digital Subscriber Lines (DSL).

The invention claimed is:

1. A method of gamified application configured to be played by one or more players, the method comprising two stages:
    in a physical reality stage:
        constructing a three-dimensional plastic-brick architectural model of interlocking components, to be used as a physical prototype for designing in a digital reality stage;
    in a digital reality stage:
        digitally reproducing an enhanced model's exterior of a realistic look, as opposed to plastic-brick look;
        creating a model's interior and decorating it with interior design tools for a realistic look; and
        upon completing the interior, allowing a player a virtual walkthrough of a completed result by virtual reality;
    characterized in that:
        the 3D architectural model of interlocking components, that appears in the physical reality stage, serves the player, during the digital reality stage, as an exact prototype for enhancing its exterior and designing and decorating the interior for a realistic look, during the digital reality stage.

2. The method of claim 1, wherein an interlocking-components look of the architectural model's exterior in the physical reality stage, is replaced by a realistic look in the digital reality stage.

3. The method of claim 1, wherein a player creates the model's interior in two steps:
    dividing into internal subspaces; and
    designing an interior.

4. The method of claim 1, wherein a player learns and applies interior design tools (2D and 3D) for design and visualization.

5. The method of claim 4, wherein a player can perform a virtual walkthrough upon completing an interior design, exploring a result of his own design.

6. A method of gamified educational application configured to be played by one or more players, the method comprising two stages:
    in a physical reality stage:
        constructing a three-dimensional, plastic-brick-based architectural model, to be used as a prototype for designing in digital reality stage;
    in a digital reality stage:
        designing and creating the model's interior of a realistic look, as opposed to plastic-brick look; and
        upon completing an interior design, allowing a player a virtual walkthrough of a completed interior;
    characterized in that:
        the physical reality model of the building, upon completion by a player, serves as a prototype for designing a model's interior of a realistic look.

7. The method of claim 6, wherein the player creates the model's interior in two steps:
    dividing the model's floor space into internal subspaces; and
    designing the model's interior.

8. The method of claim 6, wherein the player learns and applies interior design tools (2D and 3D) for design and visualization.

9. The method of claim 8, wherein the player can perform a virtual walkthrough upon completing an interior design, for exploring a result of his own design.

10. A method for gamified educational application configured to be played by one or more players, the method comprising two stages:
    in a physical reality stage:
        constructing a three-dimensional, plastic-brick-based model of a building constructed of interlocking components, to be used as a prototype for designing in digital reality;
    in a digital reality stage:
        designing and creating the model's interior of a realistic look, as opposed to plastic-brick look; upon completing the interior, allowing a player a virtual walkthrough by 3D interactive visualization, presenting a finished result; and
        creating a virtual reality environment for gaming;
    characterized in that:
        a physical reality model of the building serves as a prototype for creating an interior of a realistic look that becomes a playground for a digital reality activity.

11. The method of claim 10, wherein the player designs the model's interior in two steps:
    creating internal subspaces; and
    designing the model's interior.

12. The method of claim 10, wherein the player learns and applies interior design tools (2D and 3D) for design and visualization.

13. The method of claim 12, wherein the player learns and applies interior design tools (2D and 3D) for design, visualization and virtual walkthrough inside a redesigned model of the building.

14. A system for gamified application configured to be played by one or more players, the system comprising two environments:
- in a physical reality environment:
    - a kit of interlocking components for a physical construction of a three-dimensional architectural model to be used as a prototype for designing floor plans and home designs; and
- in a digital reality environment:
    - a digital computing system capable to carry an interactive design of floor plans and home designs related to the architectural model; and
- a Virtual Reality environment for presenting a completed home designs result;
- characterized in that:
- the architectural model, constructed in the physical reality environment, serves as a prototype for designing the floor plans and home designs in the digital reality environment.

15. The system of claim 14, wherein the digital computing system incorporates software elements of a floor plan editor and home design applications.

* * * * *